(12) United States Patent
Xu et al.

(10) Patent No.: US 6,921,993 B2
(45) Date of Patent: Jul. 26, 2005

(54) GEOMETRICALLY ALIGNING A STATOR AND A BASE PLATE FOR A SPINDLE MOTOR

(75) Inventors: Mo Xu, Singapore (SG); Victor C. Choo, Singapore (SG); YiRen Hong, Singapore (SG); PohLye Lim, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/854,377

(22) Filed: May 25, 2004

(65) Prior Publication Data

US 2005/0057107 A1 Mar. 17, 2005

Related U.S. Application Data

(60) Provisional application No. 60/503,552, filed on Sep. 16, 2003.

(51) Int. Cl.[7] ................................................ H02K 7/00
(52) U.S. Cl. ...................... 310/67 R; 310/254; 310/217
(58) Field of Search ................................. 310/216–218, 310/254, 258, 259, 91, 67 R (56) References Cited

U.S. PATENT DOCUMENTS

| | | | | |
|---|---|---|---|---|
| 5,173,628 A | * | 12/1992 | Yoshida et al. | 310/71 |
| 5,461,271 A | * | 10/1995 | Asama et al. | 310/91 |
| 5,578,883 A | * | 11/1996 | Sakashita et al. | 310/91 |
| 6,104,570 A | * | 8/2000 | Pelstring | 360/98.07 |
| 6,455,961 B1 | * | 9/2002 | Higuchi | 310/67 R |

* cited by examiner

*Primary Examiner*—Dang Le
(74) *Attorney, Agent, or Firm*—Wax Law Group (57) ABSTRACT

Stator and base plate interface alignment is provided for a spindle motor, meeting design specifications such that motor performance is maintained. A portion of a surface of the stator is separated from the base plate. Accurate stator z-height, parallelism and concentricity are provided for use with a low profile disc drive memory system. In an aspect, laminations are formed about a stator and the bottom layer laminations are formed with a smaller diameter than the top layer lamination. The stator bottom layer laminations seat on a flat base plate machined surface, avoiding a base plate corner radius. Precise machining of a small corner interface of the base plate where a stator is typically seated and aligned with the base plate is made unnecessary. Component machining costs, wear and tear to machining systems, and machining process cycle times are reduced.

17 Claims, 7 Drawing Sheets

GEOMETRICALLY ALIGNING A STATOR AND A BASE PLATE FOR A SPINDLE MOTOR

CROSS REFERENCE TO RELATED APPLICATION

This application is based on a provisional application Ser. No. 60/503,552, filed Sep. 16, 2003, entitled Motor Stator Design With Laminations Of Different Size, and assigned to the Assignee of this application and incorporated herein by reference.

FIELD OF THE INVENTION

The invention relates generally to spindle motors, and more particularly to seating a stator with a base plate, aligned with accurate z-height, parallelism and concentricity for use with a low profile disc drive memory system.

BACKGROUND OF THE INVENTION

Disc drive memory systems have realized intensified demands because of new environments for usage, miniaturization and increased performance needs. Besides traditional computing environments, including PCs, network servers and workstations, disc drive memory systems are currently used by devices including digital cameras, digital video recorders, laser printers, photo copiers, jukeboxes, video games and personal music players.

Disc drive memory systems store digital information that is recorded on concentric tracks of a magnetic disc medium. Several discs are rotatably mounted on a spindle, and the information, which can be stored in the form of magnetic transitions within the discs, is accessed using read/write heads or transducers. A drive controller is conventionally used for controlling the disc drive system based on commands received from a host system. The drive controller controls the disc drive to store and retrieve information from the magnetic discs. The read/write heads are located on a pivoting arm that moves radially over the surface of the disc. The discs are rotated at high speeds during operation using an electric motor located inside a hub or below the discs. Magnets on the hub interact with a stator to cause rotation of the hub relative to the shaft. One type of motor is known as an in-hub or in-spindle motor, which typically has a spindle mounted by means of a bearing system to a motor shaft disposed in the center of the hub. The bearings permit rotational movement between the shaft and the hub, while maintaining alignment of the spindle to the shaft.

Demands of the market and advances in technology have lead to the reduction in the physical size of disc drives. Efforts have been made to design smaller profile disc drives without loss of performance. The one-inch disc drive currently on the market includes a CF card type II with a 5 millimeter (mm) thickness. A demand exists for smaller mobile applications, and it has become essential in the industry to design disc drives having even smaller dimensions while maintaining motor stiffness. For example, a CF card type I form factor requires a disc drive having a 3.3 mm thickness but such disc drive is not yet on the market.

The demand for increased storage capacity and smaller disc drives has led to the design of higher recording area density such that the read/write heads are placed increasingly closer to the disc surface. Misalignment and mispositioning between data tracks and the read/write transducer can limit the data track density and overall performance of the disc drive system. Accurate positioning of the data head over a storage track on the disc is therefore of great importance in writing data to the disc and reading data from the disc. In current disc drive products, a commonly used type of actuator is a rotary moving coil actuator. The discs themselves are typically mounted in a stack on the hub structure of a brushless DC spindle motor. The rotational speed of the spindle motor is precisely controlled by motor drive circuitry which controls both the timing and the power of commutation signals directed to the stator windings of the motor. The hub includes a sleeve or back iron portion which carries a magnet. The stator is affixed to the base plate. Interaction between the magnet and the stator causes controlled rotation of the hub about the shaft.

Disc drive performance is related to the degree of alignment between the stator and the magnet (and therefore alignment of the stator and base plate), both axially along the axis of rotation and radially. Alignment of the magnet and stator, and alignment of the stator and base plate, in both the axial and radial direction is expensive and difficult during volume production of disc drive motors due to tolerances incurred in producing the magnet, stator and base plate parts.

Base plate materials currently utilized for a one-inch disc drive include aluminum and steel. In manufacturing a base plate for a disc drive having a thin dimension, aluminum base casting becomes ever more difficult and it has become a trend to utilize a stamping technology to reduce manufacturing costs. Additionally, as disc drives are designed with thin dimensions, base plate stiffness is a concern and materials other than aluminum possess greater stiffness. To maintain stiffness with thin dimension disc drives, a steel material such as stainless steel or cold rolled steel is typically utilized for the stamped base plate.

While a number of features of a steel base are stamped, further machining is necessary for the base and stator interface to obtain acceptable alignment. However, accurately machining a properly aligned base plate and stator interface is problematic, in part due to the small dimensions. Further, added difficulties arise in machining a stamped steel base including increased cutter wear and a longer process cycle time, as compared to machining an aluminum base. Additionally, the base plate stator interface requires further inspection after machining. Accordingly, there is a need for consistent alignment of a stator with a base plate such that motor performance is maintained and precise interface machining is unnecessary, for use with a hard disc drive having thin dimensions that meets stiffness requirements.

SUMMARY OF THE INVENTION

A stator and a base plate are provided having an interface alignment that consistently meets design specifications such that motor performance is maintained. In an embodiment, desired and accurate stator parallelism, z-height and concentricity are provided. Further, in an embodiment, the present invention improves stator stiffness, and reduces stator vibration and acoustics. The present invention may be utilized with low profile disc drive memory systems.

Precise machining of a small corner interface of the base plate wherein a stator is typically seated and aligned with the base plate is made unnecessary. In component stamping processes for forming a base, component machining costs are reduced. Wear and tear to machining systems, and machining process cycle times are reduced. Further, motor performance and space management requirements can be more easily met.

Features of the invention are achieved in part by separating a portion of the stator surface from the base plate. Motor stator laminations of variable diameter are utilized. The axial bottom layers of the stator laminations are formed with a smaller diameter as compared to the axial top layers of the stator laminations.

The stator bottom layer laminations seat on the flat base machined surface, avoiding a base plate corner radius. The bottom layer laminations of the stator bottom surface are used to set the stator z-height and parallelism with respect to the machining plane datum. A small separation can be maintained between the base plate inside diameter (ID) and the outside diameter (OD) of the stator top layer laminations, providing improved radial alignment. The outer diameter of the top layers of the stator is used to set the concentricity of the stator with respect to the rotating axis of the spindle motor. More specifically, the bottom layers of the stator laminations OD is formed less than the base ID less two multiplied by the base corner radius. Further, the total stack height of the bottom layers of the stator laminations is formed greater than the base corner radius.

Other features and advantages of this invention will be apparent to a person of skill in the art who studies the invention disclosure. Therefore, the scope of the invention will be better understood by reference to an example of an embodiment, given with respect to the following figures.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION OF THE INVENTION

Exemplary embodiments are described with reference to specific configurations. Those of ordinary skill in the art will appreciate that various changes and modifications can be made while remaining within the scope of the appended claims. Additionally, well-known elements, devices, components, methods, process steps and the like may not be set forth in detail in order to avoid obscuring the invention.

A system and method is described herein for consistently providing desired alignment of a stator and a base plate such that motor performance is maintained and precise machining of a stator and base plate small corner interface is unnecessary. In an embodiment, desired and accurate parallelism, z-height and concentricity is provided.

It is to be appreciated that features of the discussion and claims may be utilized with disc drives, low profile disc drive memory systems, spindle motors, ball bearing designs, various fluid dynamic bearing designs including hydrodynamic and hydrostatic bearings, and other motors employing a stationary and a rotatable component. Further, embodiments of the present invention may be employed with a fixed shaft, a rotating shaft, and conical bearings.

Moreover, while the figures herewith describe the present invention with regard to a design wherein a rotor magnet is radially positioned between a shaft and a stator (stator external to a hub), it is to be appreciated that embodiments of the present invention can be utilized with various other spindle motor designs, including a spindle motor having a stator radially positioned between a shaft and a magnet (stator internal to a rotor).

Also, by precise machining of a small corner interface as used herein, it is meant demanding and expensive machining to a base plate to provide seating of a stator with a base plate such that accurate and designed stator z-height, parallelism and concentricity is obtained. As an example, in the case of low profile disc drive memory systems, base vendors are currently called upon to machine a base plate corner radius such as 0.05 mm. However, it is demanding and expensive to machine a base plate corner radius below 0.1 mm., in part due to the small corner radius dimensions, increased cutter wear, longer process cycle time, and further inspection after machining. It is less demanding and expensive to machine a minimum base plate corner radius in the range of 0.15 mm to 0.2 mm.

Figure 1:
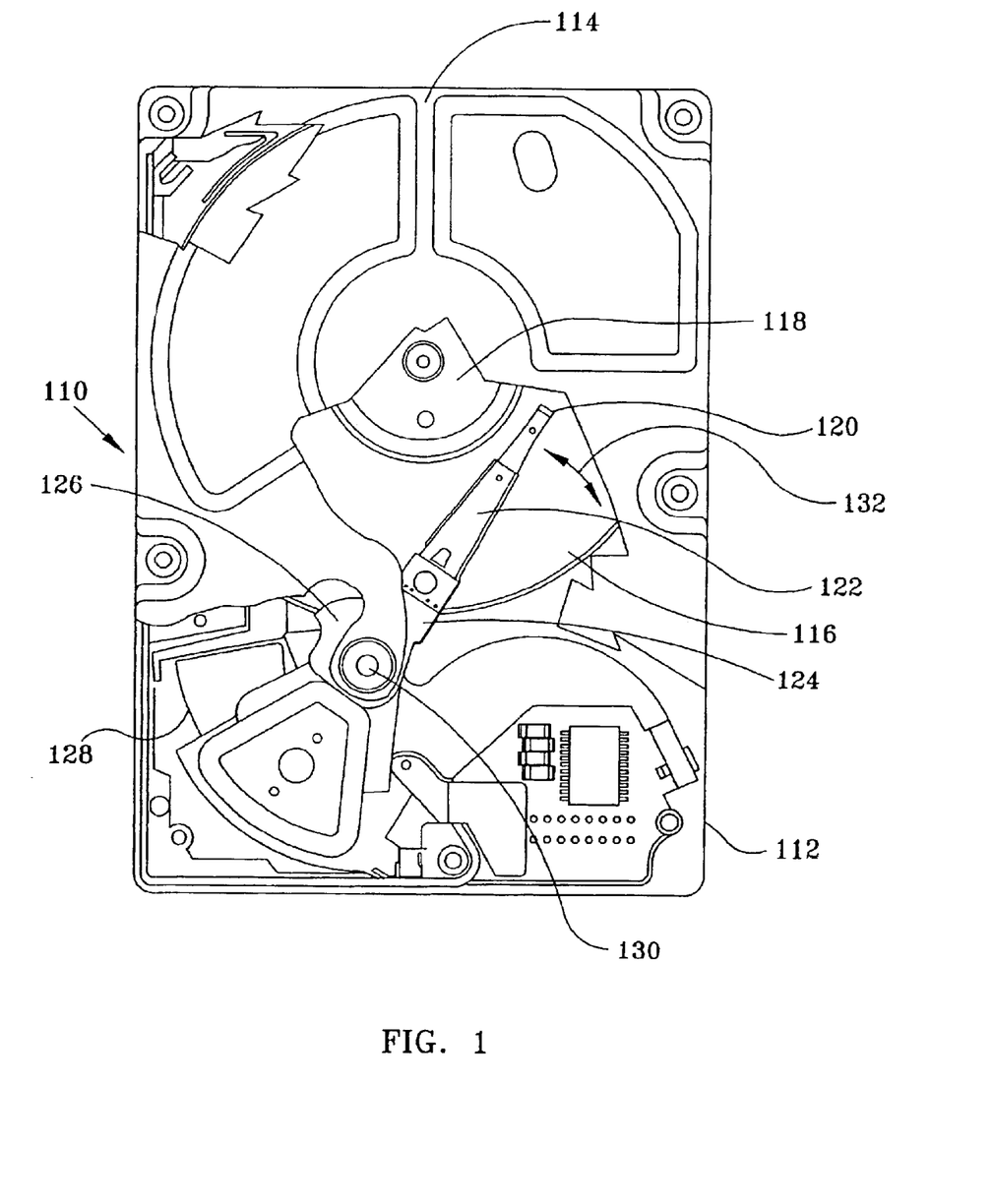
FIG. 1 is a top plan view of a disc drive data storage system in which the present invention is useful, in an embodiment of the present invention.

Referring to the drawings wherein identical reference numerals denote the same elements throughout the various views, FIG. 1 illustrates a typical disc drive data storage device 110 in which the present invention is useful. Clearly, features of the discussion and claims are not limited to this particular design, which is shown only for purposes of the example. Disc drive 110 includes housing base 112 that is combined with cover 114 forming a sealed environment to protect the internal components from contamination by elements outside the sealed environment. Disc drive 110 further includes disc pack 116, which is mounted for rotation on a spindle motor (described in FIG. 2) by disc clamp 118. Disc pack 116 includes a plurality of individual discs, which are mounted for co-rotation about a central axis. Each disc surface has an associated head 120 (read head and write head), which is mounted to disc drive 110 for communicating with the disc surface. In the example shown in FIG. 1, heads 120 are supported by flexures 122, which are in turn attached to head mounting arms 124 of actuator body 126. The actuator shown in FIG. 1 is a rotary moving coil actuator and includes a voice coil motor, shown generally at 128. Voice coil motor 128 rotates actuator body 126 with its attached heads 120 about pivot shaft 130 to position heads 120 over a desired data track along arc path 132. This allows heads 120 to read and write magnetically encoded information on the surfaces of discs 116 at selected locations.

A flex assembly provides the requisite electrical connection paths for the actuator assembly while allowing pivotal movement of the actuator body 126 during operation. The flex assembly (not shown) terminates at a flex bracket for communication to a printed circuit board mounted to the bottom side of disc drive 110 to which head wires are connected; the head wires being routed along the actuator arms 124 and the flexures 122 to the heads 120. The printed circuit board typically includes circuitry for controlling the write currents applied to the heads 120 during a write operation and a preamplifier for amplifying read signals generated by the heads 120 during a read operation.

Figure 2:
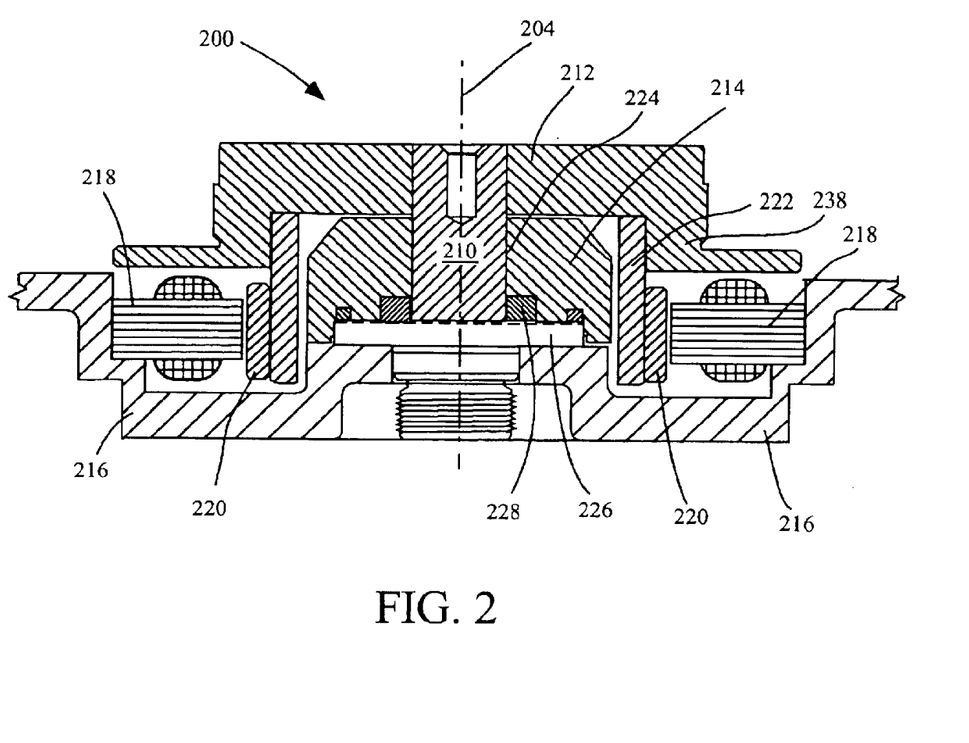
FIG. 2 is a sectional side view of a hydrodynamic bearing spindle motor with a rotating shaft used in a disc drive, in which the present invention is useful.

FIG. 2 is a sectional side view of a low profile hydrodynamic bearing spindle motor 200 used in disc drives 110 (FIG. 1) in which the stator and base plate seating of the present invention is useful. Typically, spindle motor 200 includes a stationary component and a rotatable component. Spindle motor 200 incorporates a rotating shaft 210 in the design shown. The rotatable components include shaft 210, thrust plate 228, hub 212, backiron 222, and magnet 220. The stationary components include sleeve 214, counterplate 226, base plate 216 and stator 218. Although a rotating shaft is described herein, the present invention is useful with a rotating sleeve spindle motor design as well. Rotating shaft 210 and thrust plate 228 rotate within a sleeve 214 having a bore. Sleeve 214 cooperates with an integral, single piece threaded counterplate 226 to define the bearing gap 224 within which shaft 210 rotates. Thrust plate 228 can be an integral part of shaft 210, or can be a separate piece that is attached to shaft 210, for example, by a press fit. Counterplate 226 is press fitted to or otherwise supported by sleeve 214. A fluid, such as lubricating oil or a ferromagnetic fluid fills interfacial regions between the surface of the shaft 210 and the corresponding inner surface of the sleeve 214, between the thrust plate 228 and sleeve 214, between the thrust plate 228 and the counterplate 226, and between the shaft 210 and the counterplate 226. Counterplate 226 cooperates with surfaces of thrust plate 228 and shaft 210 to establish a fluid dynamic thrust bearing that supports shaft 210 for relative rotation with sleeve 214. Shaft 210 and hub 212 additionally are affixed to backiron 222 and magnet 220, backiron 222 mounted to an end of shaft 210. Further, sleeve 214 and counterplate 226 are affixed to base plate 216. Hub 212 includes a central core and a disc carrier member 238, which supports disc pack 116 (shown in FIG. 1) for rotation about sleeve 214. Disc pack 116 is held on disc carrier member 238 by disc clamp 118.

In order to promote the flow of fluid over bearing surfaces, typically one of two opposing surfaces of each such assembly carries sections of pressure generating grooves (not shown), including asymmetric and symmetric grooves. The grooving pattern includes and is not limited to one of a herringbone pattern and a sinusoidal pattern. Asymmetric and symmetric grooves induce fluid flow in the interfacial region and generate a localized region of dynamic high pressure and radial stiffness. As shaft 210 rotates, pressure is built up in each of its grooved regions. In this way, shaft 210 supports hub 212 for constant high speed rotation.

One or more magnets 220 are mounted to backiron 222, forming a rotor for spindle motor 200. The magnets 220 interact with a stator 218 attached to the base 216 to cause the hub 212 and shaft 210 to rotate. Magnet 220 can be formed as a unitary, annular ring or can be formed of a plurality of individual magnets that are spaced about the periphery of hub 212. Magnet 220 is magnetized to form one or more magnetic poles. Stator 218 is coaxial with magnet 220 and has a radial position that is external to magnet 220 with respect to a central axis.

As used herein, the terms "axially" or "axial direction" refers to a direction along a centerline axis length of a shaft (i.e., along axis 204 of shaft 210), and "radially" or "radial direction" refers to a direction perpendicular to the centerline axis of a shaft. "Z-direction" is the same direction as axial direction, and "z-height" is the height length in the z-direction. Further, by "with respect to the rotating axis" as used herein it is meant that the rotating axis is along the centerline axial axis of the central motor rotating component.

Figure 3:
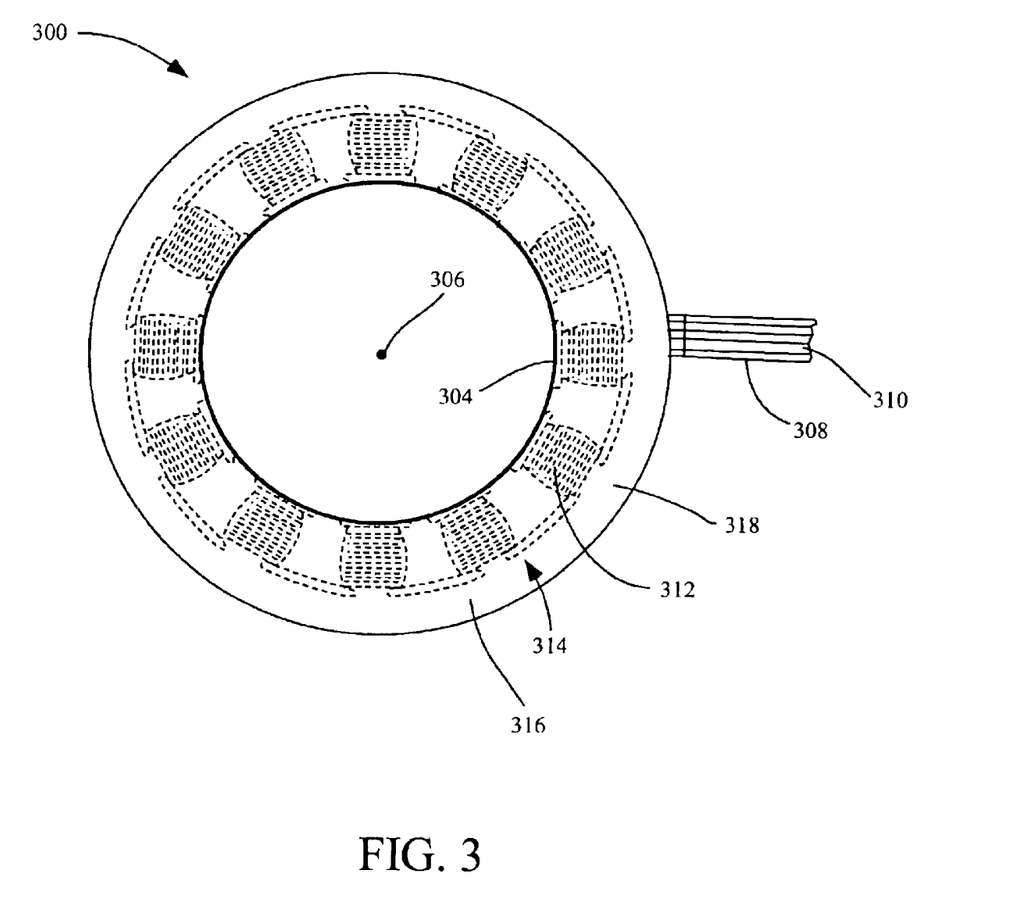
FIG. 3 is a plan view of a stator of the kind used in the spindle motor as in FIG. 2.

Referring to FIG. 3, a plan view of a stator is illustrated of the kind used in the spindle motor as in FIG. 2. Stator 300 includes stator laminations 314 comprising a back-iron 316 and a plurality of teeth 318, which extend inward from backiron 316 toward a central axis 306. Teeth 318 are disposed about a circumference 304 of stator 300. A plurality of phase windings 312 (stator coil) are wound around on stator teeth 318 for magnetic communication with the internal rotor. Phase windings 312 can have a number of winding configurations. Phase windings 312 are sequentially energized to polarize the stator. A plurality of magnets 220 are disposed in alternating polarity adjacent stator 300. As phase windings 312 are sequentially energized in alternating polarity, the magnetic attraction and repulsion of each stator 300 to the adjacent magnet 220 causes a controlled rotation of hub 212, thereby rotating the disc and passing information to storage tracks beneath the head 120 (FIG. 1).

Motor drive circuitry controls the timing and power of commutation signals directed to phase windings 312. A flexible printed circuit (PC) 310 carries a plurality of conductors 308 that are electrically connected to start and finish winding terminations. The terminations are electrically connected to phase windings 312 in a known manner.

Figure 4:
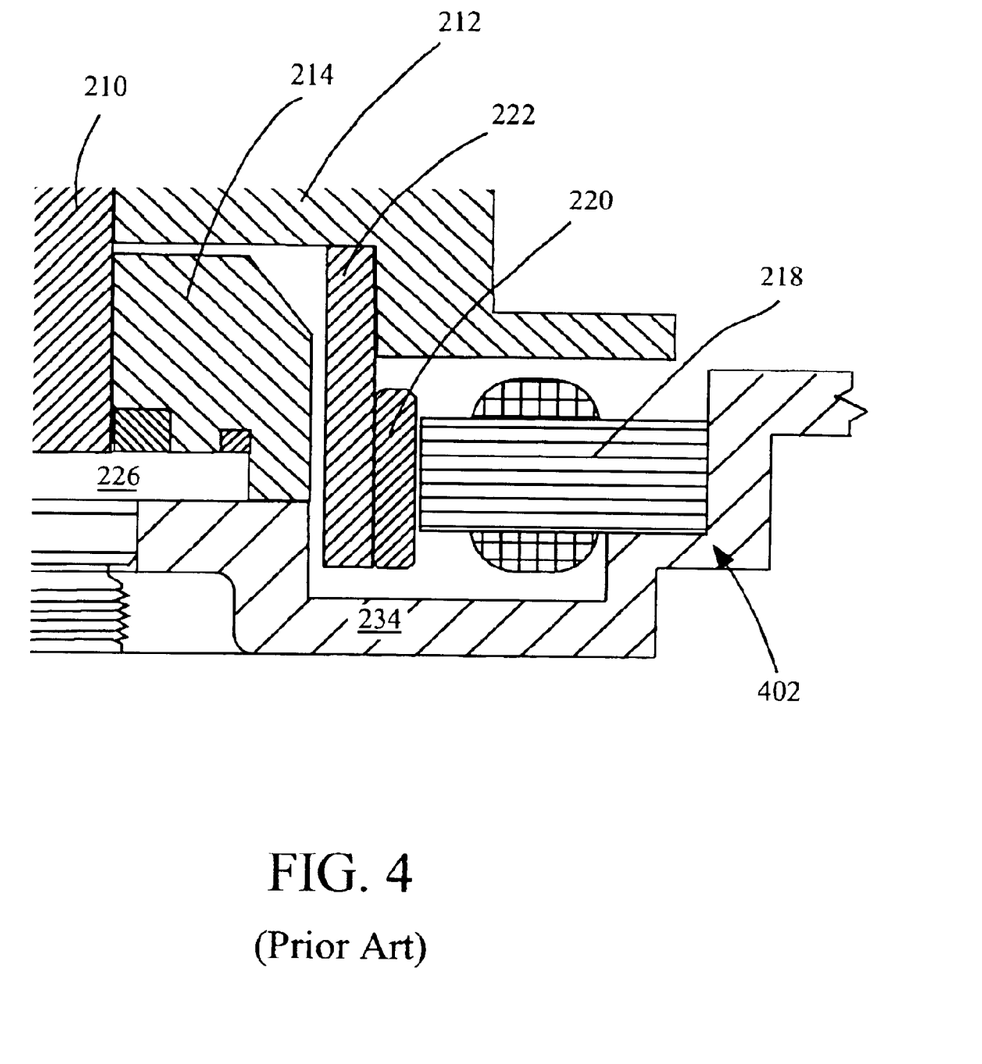
FIG. 4 is a sectional side view of a portion of the hydrodynamic bearing spindle motor of FIG. 2, with an enlarged view of a stator and base plate interface, in a prior art design.

FIG. 4 shows an enlarged view of the seating and interface of the stator 218 and base plate 234 of prior art designs of spindle motor 200. In conventional designs, a stator is mounted to a base plate by pressing the stator against a side wall of the base plate. Various conventional mounting methods are utilized to mount a stator to a base plate, including employing O-rings, fasteners and adhesives. The bottom surface of a stator is used to set the z-height and parallelism with respect to a machining plane datum, the machining plane datum being a machined radial surface of base plate 234. The outer diameter of a stator is used to set the concentricity of a stator with respect to the rotating axis.

In a number of one-inch disc drive designs, the maximum radius of a corner interface of a base plate is 0.05 mm, per design specifications. A corner interface having a radius of 0.15 mm. to 0.2 mm. can be more easily machined in some limited cases, although machining a corner radius (R) of less than 0.1 mm. is difficult and expensive.

During production of spindle motors such as spindle motor 200, it has proven to be difficult and expensive to machine corner interface 402 of base plate 234 such that stator 218 is properly seated with base plate 234, and properly aligned with magnet 220, per design requirements. As described above, accurately machining a properly aligned base plate and stator interface is problematic, in part due to the small dimensions of corner interface 402. Affixing a stator with a base plate by press fit is problematic for designs as in FIG. 4, in part since the stator is positioned adjacent to the small dimensions of a corner base plate interface, which must be machined accurately. Further, proper seating and alignment critically affects motor performance.

Figure 5:
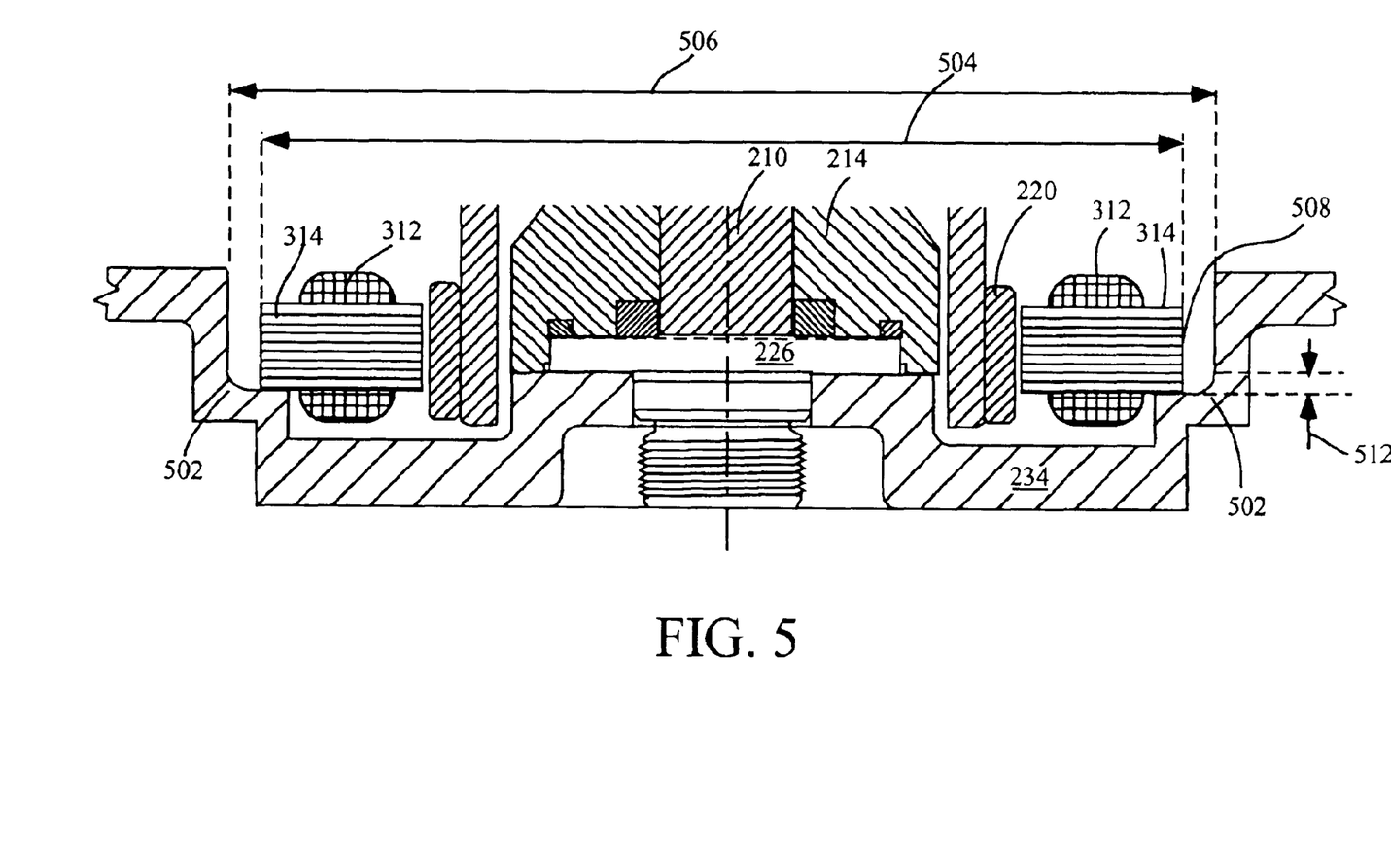
FIG. 5 is a sectional side view of a portion of the hydrodynamic bearing spindle motor of FIG. 2, with an enlarged view of the stator and base plate interface, and having separation between a portion of the stator and the base plate, in an embodiment of the present invention.

As illustrate in FIG. 5, clearance is formed between the stator OD 504 and the base plate ID 506, in an embodiment of the invention. By mathematical formula, it can be appreciated that the stator OD<Base plate ID−R. The stator OD 504 is measured from the radial OD 508 of stator laminations 314. That is, the clearance between the stator OD 504 and base plate ID 506 is determined by the separation between the radial OD 508 of stator laminations 314 and the base plate ID 506. By "separation," as used herein, it is meant an intervening space or gap, rather than a physical component.

In an embodiment, base plate corner 502 is machined having a larger base plate corner radius 512 (i.e., larger than 0.2 mm.), which can require less machining precision. However, with less machining precision of base plate corner 502, and a larger base plate corner radius, unacceptable seating and alignment of a stator and a base plate can result, such that motor performance is affected. To help remedy this concern, in an embodiment, the present invention accommodates less precision machining and a larger base plate corner radius by separating the stator OD 504 and the base plate corner radius 512. Stator z-height and parallelism is thus maintained. A radial separation (about 2 R) is formed between the stator OD 504 and the base plate ID 506.

Figure 6A:
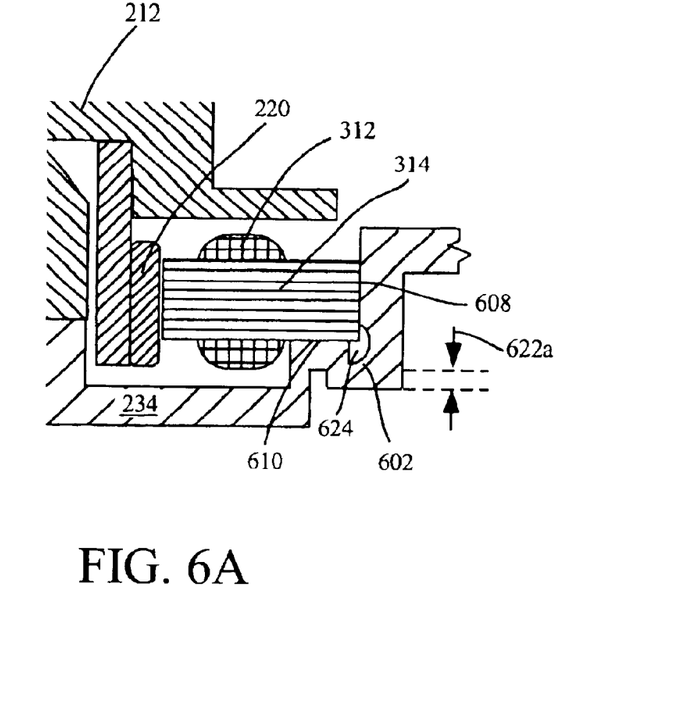
FIG. 6A is a sectional side view of a portion of the hydrodynamic bearing spindle motor of FIG. 2, with an enlarged view of the stator and base plate interface, and having an undercut feature at a corner of the base plate, in an embodiment of the present invention.

FIG. 6A illustrates a stator and base plate interface, and an axial undercut feature at a corner of the base plate. Axial undercut 624 is formed within base plate corner 602. In an embodiment, by allowing axial undercut 624, the present invention accommodates less precision machining of a small dimension corner interface of base plate corner 624. The axial OD 610 of stator laminations 314 is used to set the z-height and parallelism of the stator with respect to a machining plane datum. The radial OD 608 of stator laminations 314 is used to set the concentricity of the stator with respect to the rotating axis. Although less precision machining is utilized, accurate stator z-height, parallelism and concentricity, and thus motor performance, is maintained. Further, in this embodiment, base plate corner 602 forms an axial protrusion 622a, maintaining base plate 234 stiffness and occupying axial space. In an embodiment, the axial length of axial protrusion 622a is 0.2 mm.

Figure 6B:
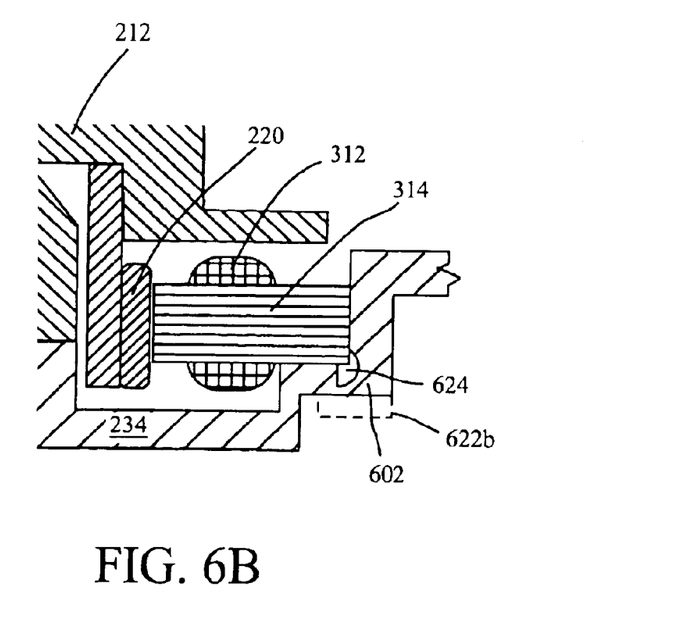
FIG. 6B is a sectional side view of a portion of the hydrodynamic bearing spindle motor of FIG. 2, with an enlarged view of the stator and base plate interface, and having an undercut feature at a corner of the base plate with a protrusion removed, in an embodiment of the present invention.

As illustrated in FIG. 6B, in an embodiment, axial protrusion 622a is removed (shown by axial protrusion removal outline 622b) to minimize an axial loss. An axial space savings (ie., 0.15 mm to 0.2 mm) is provided at base plate corner 602. This is a significant axial space savings since a conventional one inch disc drive, CF card type II with a 5 mm thickness, typically utilizes a base plate having a thickness in the range of 0.4 mm. to 0.5 mm. For thinner disc drives, such as a CF card type I form factor having a 3.3 mm thickness disc drive, the typical axial thickness of the base plate is in the range of 0.3 mm to 0.4 mm. Further, the axial thickness of base plate 234 adjacent to the undercut (after axial protrusion 622a is removed) is in the range of 0.15 mm. to 0.2 mm.

It is to be appreciated that a radial undercut feature (vs. an axial undercut) can also be employed at a corner of the base plate. Further, any protrusion formed by a radial undercut feature may similarly be removed to minimize a radial loss.

Figure 7:
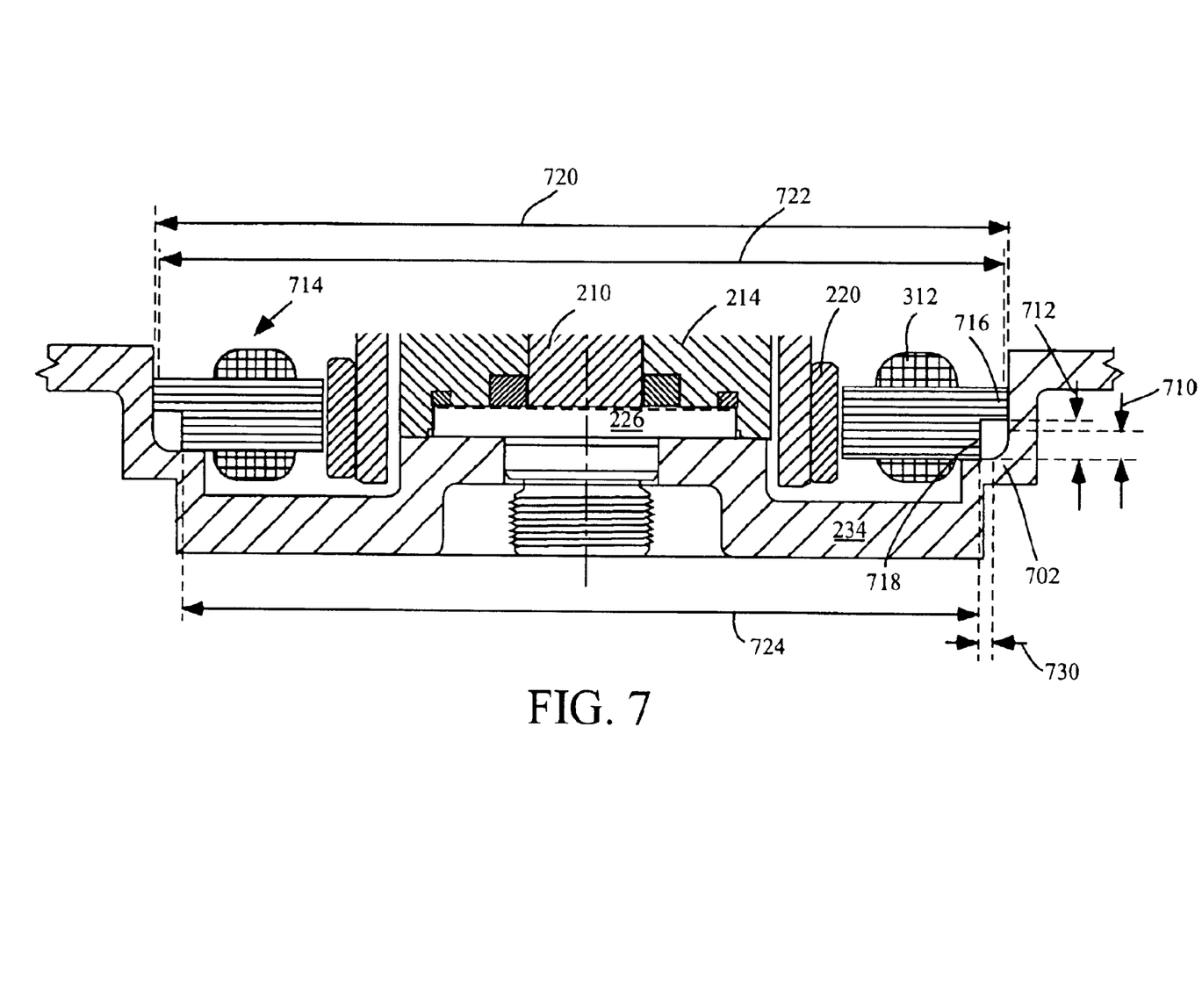
FIG. 7 is a sectional side view of a portion of the hydrodynamic bearing spindle motor of FIG. 2, with an enlarged view of the stator and base plate interface, and having a stator with laminations of a varied diameter, in an embodiment of the present invention.

FIG. 7 illustrates an enlarged view of a stator and a base plate interface, wherein a portion of a radial OD of the stator is separated from the base plate by utilizing a stator having laminations of a varied diameter, in an embodiment of the present invention. The stator bottom layer laminations 718 are formed with a smaller diameter as compared to the stator top layer laminations 716. In an embodiment, the OD 724 of bottom layer laminations 718 are formed having a diameter in the range 0.2 millimeters to 0.6 millimeters smaller than the stator OD 722 of top layer laminations 716. Any magnetic flux saturation through stator bottom layer laminations 718 can be monitored for performance effect. The stator top layer laminations 716 seats with the base plate ID 720. Thus, stator OD 724 of bottom layer laminations 718 is separated from the base plate ID 720. The stator bottom layer laminations 718 seats on a flat base machined surface of base plate 234, avoiding base plate corner radius 710. The stator bottom layer laminations 718 set the stator z-height and parallelism with respect to the machining plane datum. The stator OD 722 of top layer laminations 716 sets the concentricity of the stator with respect to the rotating axis of the spindle motor. Further, in an embodiment, a small separation is maintained between the base plate ID 720 and the stator OD 722 of top layer laminations 716, for improving radial alignment of the stator and the base plate 234. In an embodiment, base plate ID 720 is about 18.1 mm, and stator OD 722 at top layer laminations 716 is about 18 mm. Stator 714 can be press fit onto base 234, and epoxy or adhesive can be utilized between the base plate ID 720 and the stator OD 722 of top layer laminations 716, as well as between the axial bottom of stator bottom layer laminations 718 and the flat base machined surface of base plate 234.

The stator OD 724 of bottom layer laminations 718 is formed less than the base plate ID 720 minus two multiplied by a radius 710 of the base plate corner 702. The mathematical comparison may be shown as the following: bottom layer laminations OD<base plate ID−2*base plate corner radius. Radial distance 730 represents a predetermined distance or gap between the base plate corner radius 710 and the stator OD 724 of bottom layer laminations 718. Further, the axial stack height 712 of the bottom layer laminations 718 is formed greater than the radius 710 of the base plate corner 702. The mathematical formula comparison may be shown as the following: bottom layer laminations height>base plate corner radius. In an embodiment, the base plate corner 702 is formed having a minimum radius 710 in the range of 0.15 millimeters to 0.2 millimeters, and the bottom layer laminations 718 are formed having a minimum axial stack height 712 in the range of 0.21 millimeters to 0.5 millimeters.

Further, by utilizing stator laminations of variable diameter, rather than employing an undercut feature, a minimized axial height and a predefined stiffness of base plate 234 is maintained. As described herein, a predefined stiffness is a stiffness substantially analogous to a base plate having a conventional axial thickness (i.e., 0.5 mm. in the case of a one inch disc drive) wherein spindle motor design requirements are met including reduced vibration and acoustic vibrations.

Other features and advantages of this invention will be apparent to a person of skill in the art who studies this disclosure. For example, it is to be appreciated that while the present invention discusses ranges of diameters and radius that can apply to small dimension disc drives, the methods described herein can also be useful to spindle motors having much larger dimensions. Thus, exemplary embodiments, modifications and variations may be made to the disclosed embodiments while remaining within the spirit and scope of the invention as defined by the appended claims.

We claim:

1. A spindle motor comprising:
   a rotatable component defining a journal gap and relatively rotatable with a stationary component;
   a base plate affixed to the stationary component; and a stator, affixed to the stationary component, for generating an electromagnetic force that interacts with a magnet affixed to the rotatable component and drives the rotatable component, wherein a first portion of the stator is positioned adjacent to and aligned with an axial portion of the base plate, and a second portion of the stator is positioned adjacent to and aligned with a radial portion of the base plate, wherein the axial portion and the radial portion of the base plate converge at a corner, and wherein laminations are formed about the stator having a varied diameter defining a separation between a portion of a surface of the stator and the base plate at the corner.

2. The spindle motor as in claim 1, wherein the laminations comprise a top layer formed about the first portion of the stator and a bottom layer formed about the second portion of the stator, wherein the bottom layer laminations are formed with a smaller diameter than the top layer laminations, and wherein an outside diameter of the lower portion of the stator is smaller than an outside diameter of the upper portion of the stator.

3. The spindle motor as in claim 2, wherein the outside diameter of the stator having the bottom layer laminations is less than an inside diameter of the base plate minus two multiplied by a radius of the base plate corner (bottom layer laminations OD<base plate ID−2*base plate corner radius), and wherein an axial height of the bottom layer laminations are greater than the radius of the base plate corner (bottom layer laminations height>base plate corner radius).

4. The spindle motor as in claim 1, wherein the bottom layer laminations are positioned to set the z-height and parallelism of the stator with respect to the machining plane datum, and the top layer laminations are positioned to set the concentricity of the stator with respect to an axial axis of the rotatable component.

5. The spindle motor as in claim 2, wherein the bottom layer laminations are formed having a diameter in the range 0.2 millimeters to 0.6 millimeters smaller than the diameter of the top layer laminations.

6. The spindle motor as in claim 3, wherein the base plate corner is formed with a minimum radius in the range of 0.15 millimeters to 0.2 millimeters, and wherein the bottom layer laminations are formed with a minimum axial height in the range of 0.21 millimeters to 0.5 millimeters.

7. A spindle motor for incorporation into a disc drive storage system comprising:
a rotatable component defining a journal gap and relatively rotatable with a stationary component;
a data storage disc attached to the rotatable component;
an actuator supporting a head proximate to the data storage disc for communicating with the data storage disc
a base plate affixed to the stationary component; and
a stator, affixed to the stationary component, for generating an electromagnetic force that interacts with a magnet affixed to the rotatable component and drives the rotatable component, wherein a first portion of the stator is positioned adjacent to and aligned with an axial portion of the base plate, and a second portion of the stator is positioned adjacent to and aligned with a radial portion of the base plate, wherein the axial portion and the radial portion of the base plate converge at a corner, and wherein laminations are formed about the stator having a varied diameter defining a separation between a portion of a surface of the stator and the base plate at the corner.

8. The spindle motor for incorporation into a disc drive storage system as in claim 7, wherein the laminations comprise a top layer formed about the first portion of the stator and a bottom layer formed about the second portion of the stator, wherein the bottom layer laminations are formed with a smaller diameter than the top layer laminations, and wherein an outside diameter of the lower portion of the stator is smaller than an outside diameter of the upper portion of the stator.

9. The spindle motor for incorporation into a disc drive storage system as in claim 7, wherein the outside diameter of the stator having the bottom layer laminations is less than an inside diameter of the base plate minus two multiplied by a radius of the base plate corner (bottom layer laminations OD<base plate ID−2*base plate corner radius), and wherein an axial height of the bottom layer laminations are greater than the radius of the base plate corner (bottom layer laminations height>base plate corner radius).

10. The spindle motor for incorporation into a disc drive storage system as in claim 7, wherein the bottom layer laminations are positioned to set the z-height and parallelism of the stator with respect to the machining plane datum, and the top layer laminations are positioned to set the concentricity of the stator with respect to an axial axis of the rotatable component.

11. The spindle motor for incorporation into a disc drive storage system as in claim 8, wherein the bottom layer laminations are formed having a diameter in the range 0.2 millimeters to 0.6 millimeters smaller than the diameter of the top layer laminations.

12. The spindle motor for incorporation into a disc drive storage system as in claim 9, wherein the base plate corner is formed with a minimum radius in the range of 0.15 millimeters to 0.2 millimeters, and wherein the bottom layer laminations are formed with a minimum axial height in the range of 0.21 millimeters to 0.5 millimeters.

13. In a spindle motor having a journal defined between a relatively rotatable component and a stationary component, a method comprising:
affixing a base plate to the stationary component;
affixing a stator to the stationary component, for generating an electromagnetic force that interacts with a magnet affixed to the rotatable component and drives the rotatable component, wherein a first portion of the stator is positioned adjacent to and aligned with an axial portion of the base plate, and a second portion of the stator is positioned adjacent to and aligned with a radial portion of the base plate, wherein the axial portion and the radial portion of the base plate converge at a corner, and wherein laminations are formed about the stator having a varied diameter defining a separation between a portion of a surface of the stator and the base plate at the corner.

14. The method as in claim 13, wherein forming laminations about the stator comprises forming a top layer about the first portion of the stator and forming a bottom layer about the second portion of the stator, wherein the bottom layer laminations are formed with a smaller diameter than the top layer laminations, and wherein an outside diameter of the lower portion of the stator is smaller than an outside diameter of the upper portion of the stator.

15. The method as in claim 14, wherein the outside diameter of the stator is formed having the bottom layer laminations outside diameter less than an inside diameter of the base plate minus two multiplied by a radius of the base plate corner (bottom layer laminations OD<base plate ID−2*base plate corner radius), and wherein an axial height of the bottom layer laminations is formed having a greater axial height than the radius of the base plate corner (bottom layer laminations height>base plate corner radius).

16. The method as in claim 14, wherein the bottom layer laminations are positioned to set the z-height and parallelism of the stator with respect to the machining plane datum, and the top layer laminations are positioned to set the concentricity of the stator with respect to an axial axis of the rotatable component.

17. The method as in claim 15, wherein the bottom layer laminations are formed having a diameter in the range 0.2 millimeters to 0.6 millimeters smaller than the diameter of the top layer laminations, and wherein the base plate corner is formed with a minimum radius in the range of 0.15 millimeters to 0.2 millimeters, and wherein the bottom layer laminations are formed with a minimum axial height in the range of 0.21 millimeters to 0.5 millimeters.

* * * * *